May 8, 1962     M. BENTELE     3,033,180
ROTATING COMBUSTION ENGINE SEAL CONSTRUCTION
Filed Jan. 29, 1960     3 Sheets-Sheet 1
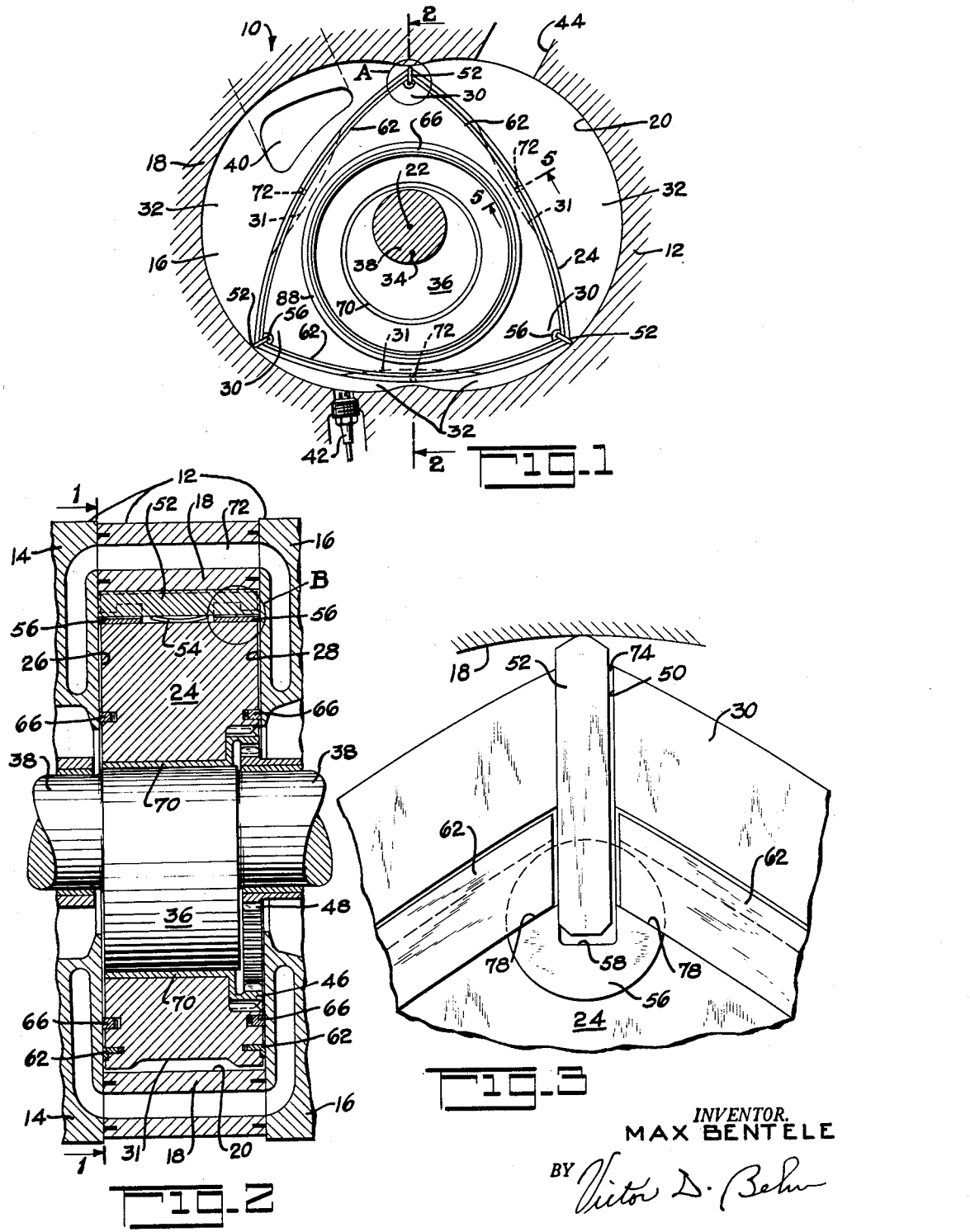
INVENTOR.
MAX BENTELE
ATTORNEY

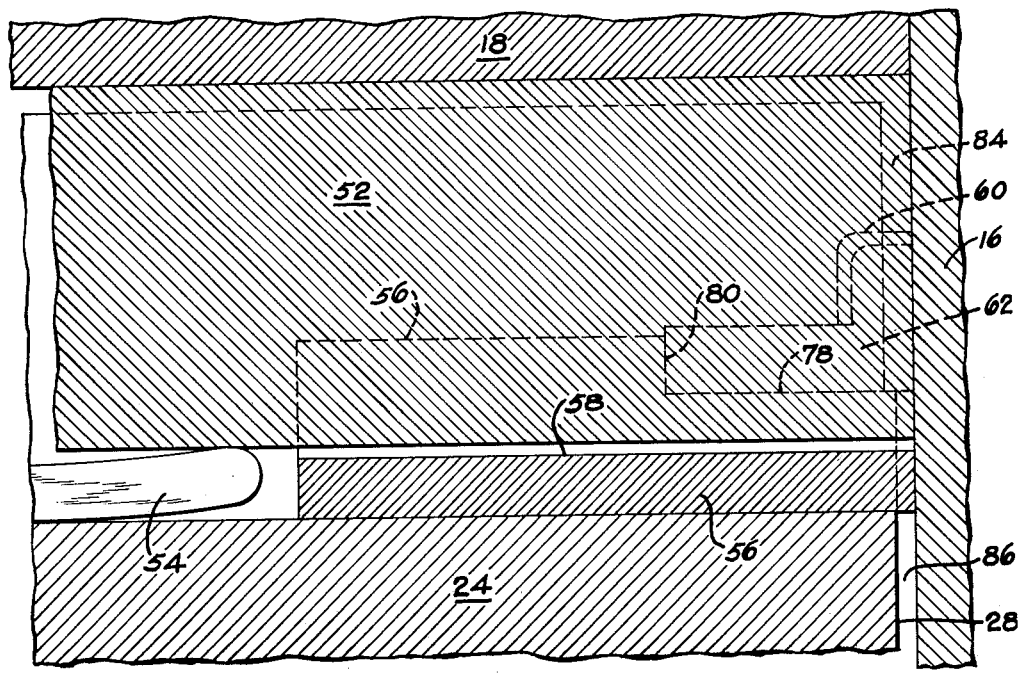
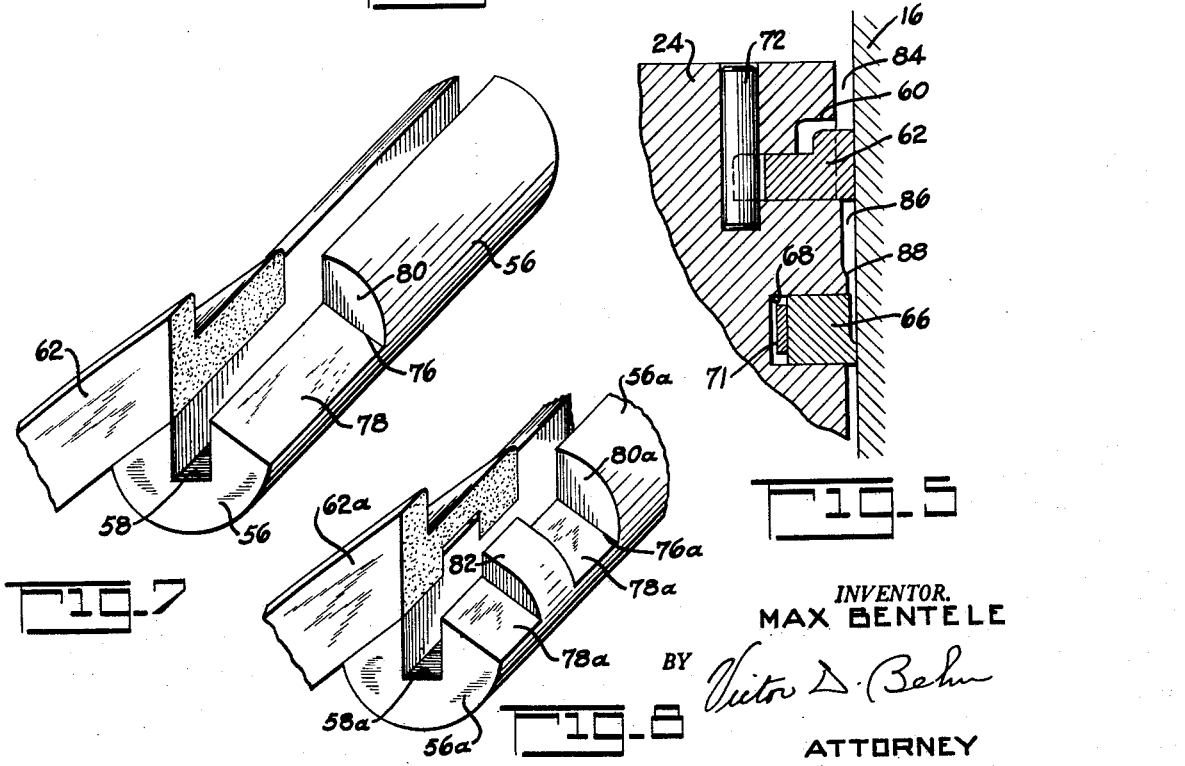

INVENTOR.
MAX BENTELE
ATTORNEY

United States Patent Office 3,033,180
Patented May 8, 1962

3,033,180
ROTATING COMBUSTION ENGINE SEAL CONSTRUCTION
Max Bentele, Ridgewood, N.J., assignor to Curtiss-Wright Corporation, a corporation of Delaware
Filed Jan. 29, 1960, Ser. No. 5,497
17 Claims. (Cl. 123—8)

The invention relates to combustion engines of the type illustrated in copending application Serial No. 774,-517, filed November 17, 1958, now U.S. Patent No. 2,988,065 and is particularly directed to a seal construction for such engines.

Such combustion engines comprise an outer body having axially-spaced end walls interconnected by a peripheral wall to form a cavity therebetween and an inner body or rotor is received within said cavity between the cavity end walls. The inner surface of said peripheral wall preferably is parallel to the axis of said cavity and, as viewed in a plane transverse to said axis, said inner surface has a multi-lobed profile which preferably is an epitrochoid. The axis of said rotor is parallel to but spaced from the axis of the outer body cavity and said rotor has axially-spaced end faces disposed adjacent to said outer body end walls and also has a plurality of circumferentially-spaced apex portions. The rotor is rotatable relative to the outer body such that said apex portions continuously engage the inner surface of said peripheral wall to form a plurality of working chambers between said rotor peripheral wall which vary in volume, during engine operation, as a result of relative rotation of said rotor and outer body. Such engines also include an intake port for admitting a fuel-air mixture to said chambers, an exhaust port for said chambers and suitable ignition means such that during engine operation the working chambers of the engine have a cycle of operation which includes the four phases of intake, compression, expansion and exhaust. As described in said copending application this cycle of operation is achieved as a result of the relative rotation of said inner rotor and outer body and for this purpose both said inner rotor and outer body may rotate or one, preferably the inner rotor, may rotate while the outer body is stationary.

For efficient operation of the engine, its working chambers should be sealed and therefore an effective seal should be provided between each rotor apex portion and the inner surface of the peripheral wall of the outer body as well as between the end faces of the inner rotor and the end walls of the outer body.

An object of the invention comprises the provision of a novel and effective seal arrangement for said engine working chambers. A further object resides in the provision of a simple one-piece seal carried by each apex portion of the inner rotor.

Other objects of the invention will become apparent when reading the annexed detailed description in connection with the drawing in which:

FIG. 1 is a diagrammatic transverse view of a rotary engine embodying the invention;

FIG. 2 is a sectional view taken along line 2—2 of FIG. 1;

FIG. 3 is an enlarged view of the circled portion A of FIG. 1;

FIG. 4 is an enlarged view of the circled portion B of FIG. 2;

FIG. 5 is a fragmentary sectional view taken along lines 5—5 of FIG. 1;

FIG. 7 is a perspective view of one of the intermediate seal members with the adjacent end of one of the two cooperating end face seal strips; and FIG. 8 is a view similar to FIG. 7 illustrating a modified construction.

Figure 6:
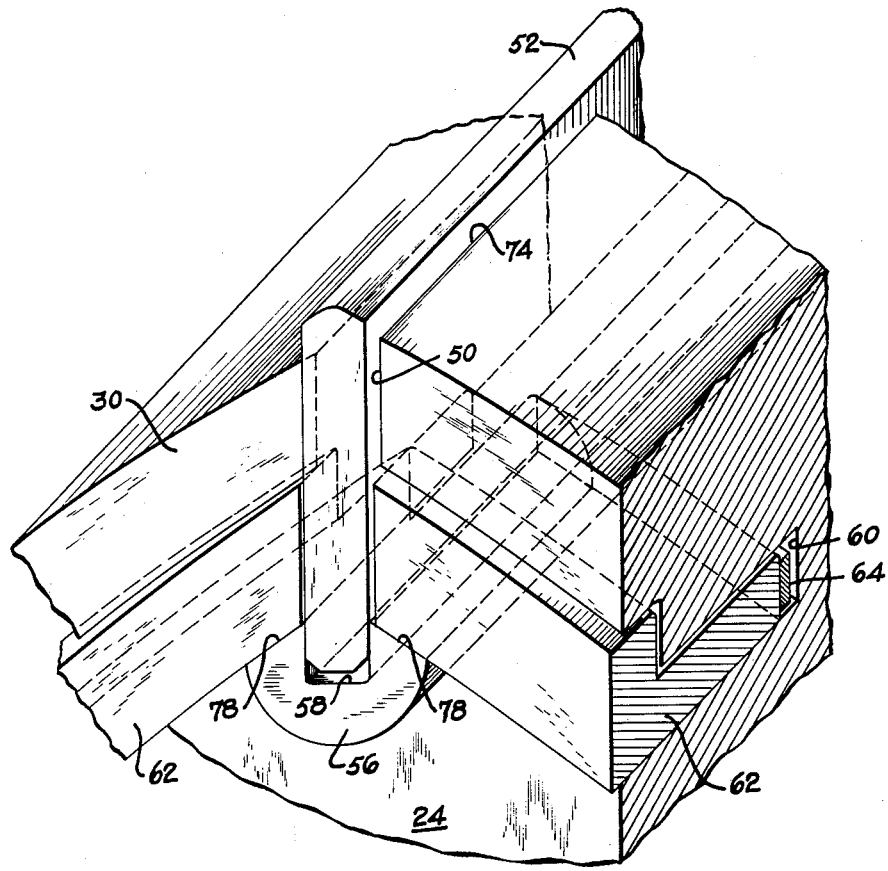
FIG. 6 is a perspective view of the structure shown in FIG. 3.

Referring to the drawing a rotary internal combustion is schematically indicated by reference numeral 10. Said engine 10 comprises an outer body 12 having axially-spaced end walls 14 and 16 with a peripheral wall 18 connected therebetween to form a cavity 20. As viewed in a plane (FIG. 1) transverse to the axis 22 of the cavity 20, said cavity has a multi-lobed profile. In the specific embodiment illustrated said cavity profile has two lobes although the engine is not limited to this specific number of lobes.

An inner rotor 24 is disposed within the cavity 20 of the outer body 12. The inner rotor has axially-spaced end faces 26 and 28 disposed adjacent to the outer body end walls 14 and 16. In addition the inner rotor has a plurality of circumferentially-spaced apex portions 30 which as explained in said aforementioned application preferably are one more in number than the number of lobes of the cavity 20. As illustrated the rotor 24 has three apex portions 30 and the periphery of the rotor has a generally triangular profile. As hereinafter more fully, explained, said apex portions 30 are in sealing engagement with the inner surface of the peripheral wall 18 to form a plurality (three as illustrated) of working chambers 32 between the inner rotor 24 and outer body 12. Each working chamber 32 includes a trough 31 formed in the adjacent peripheral face of the rotor 24, each said trough forming a substantial part of the combustion space during combustion in said chamber. The geometrical axis 34 of the rotor 24 is offset from and is disposed parallel to the axis 22 of the outer body.

In the engine 10 illustrated the outer body 12 is stationary while the inner rotor 24 is journaled on an eccentric portion 36 of a shaft 38, said shaft being co-axial with that of the cavity 20 of said outer body. Upon rotation of the inner rotor 24 relative to the outer body 12 the working chambers 32 vary in volume. An intake port 40 is provided in one or both end walls 14 and 16 for admitting air and fuel into the working chambers, a spark plug 42 is provided for igniting the combustion mixture and an exhaust port 44 is provided in the peripheral wall for discharge of the exhaust gases from the working chambers 32. As more fully explained in the aforementioned copending application, during engine operation the working chambers 32 have a cycle of operation including the four phases of intake, compression, expansion and exhaust, said phases being similar to the strokes in a reciprocating-type internal combustion engine having a four-stroke cycle. In order to maintain the relative motion of the inner rotor 24 relative to the stationary outer body an internal gear 46 is, as illustrated, co-axially secured to the inner rotor and is disposed in mesh with a fixed gear 48 secured to the outer body by means not shown, said fixed gear being co-axial with the shaft 38. As also explained in said copending application the outer body 12 as well as the inner body 24 may rotate instead of, as in the embodiment illustrated, only one of said bodies rotating.

For efficient engine operation the working chambers 32 should be sealed. For this purpose each rotor apex portion 30 has a groove 50 extending inwardly, preferably radially, from its apex and running from one end face 26 to the other end face 28 in a direction parallel to the rotor axis. A metallic seal strip 52 is received within each of said apex grooves 50 and a spring 54 under each seal strip urges it radially outwardly so that it projects beyond its groove 50 into sealing engagement with the inner surface of the peripheral wall 18.

The bottom of each apex groove 50 has a cylindrical enlarged portion at each end of the groove and an intermediate seal member 56 is slidably received within each such cylindrical portion. Each intermediate seal member 56 has a slot 58 for receiving the radially inner edge of the adjacent end of a seal strip 52 for sealing cooperation therewith.

Each end face 26 and 28 of the inner rotor 24 has a plurality of grooves 60 therein running from one apex portion 30 of the rotor to the adjacent apex portion and a one-piece seal strip 62 is received within each such groove. For ease of fabrication each groove 60 for a seal strip 62 preferably has the shape of a circular arc in the plane of its rotor end face. Also each strip 62 is disposed adjacent to but inwardly of the rotor periphery, said periphery being generally triangular in shape with outwardly arched sides. A spring 64 behind each end face seal strip 62 urges it axially outwardly so that said strip 62 projects axially beyond the adjacent rotor end face into sealing engagement with the adjacent housing end wall. As illustrated each end face seal strip 62 has an L-shaped cross-section with one leg being received within its groove 60 and with its other leg being parallel to the adjacent end wall 14 or 16 of the outer body.

The seal strips 62 and intermediate seal members 56 at each rotor end face cooperate to provide a continuous contact area in sealing engagement with the adjacent end wall 14 or 16 of the outer body 12, said seal contact area encircling the rotor axis and being disposed adjacent to the rotor periphery whereby a seal is provided adjacent to the rotor periphery against inward flow of combustion gases between the rotor end faces 26 and 28 and the end walls 14 and 16. In addition a seal ring 66 is disposed in a circular groove 68 in each end face of the rotor 24 radially outwardly of the journal bearing 70 for said rotor on the shaft eccentric 36 and radially inwardly of the end face seal strips 62. The seal rings 66 function as oil seals to prevent leakage of lubricating oil radially outwardly beyond said seal rings 66 between their associated rotor end faces and outer body and walls. Suitable spring means 71 may be provided behind each oil seal 66.

As illustrated the intermediate seal members 56 and end face seal strips 62 and seal rings 66 preferably are provided at both end faces of the inner rotor. However, it is also possible to provide a good seal fit between one rotor end face and the adjacent end wall of the outer body 12 and only provide the intermediate seal members 56 end face seal strips 62 and seal ring 66 at the other end face of the rotor.

A pin 72 carried by the rotor approximately midway between each of its apex portions 30 may be provided for interlocking engagement with a notch in an end face seal strip 62 to prevent movement of each said seal strip along its groove 60 relative to the rotor, thereby preventing contact and pounding of the seal strips 62 against the sides of the apex seal strips 52. This interlocking feature is best seen in FIG. 5.

The pressure differential between each two adjacent working chambers 32 urges the apex seal strip 52 therebetween laterally toward one side face or the other of its groove 50 for sealing engagement therewith thereby leaving a slight clearance 74 (FIG. 3) at the other side face of said groove. As a result, gas pressure from the adjacent working chamber is transmitted through said clearance 74 into the bottom of the associated groove 50 whereby said pressure urges the two intermediate seal members 56 at the ends of said groove axially into sealing engagement with the end walls 14 and 16 of the outer body 12 and also adds to the force of the spring 54 urging said apex seal strip 52 radially outwardly.

The outer end of each intermediate seal member 56 has its upper portion cut back to form two steps 76, one on each side of its slot 58 for receiving the end of the adjacent seal strip, so that said seal strips are arranged to bear against the bottom surfaces 78 of their respective steps 76. The gas pressure within the working chambers 32 urge each end face seal strip 62 radially inwardly against the radially inner face of its groove 60 as well as against the bottom surfaces 78 of the steps 76 in the associated intermediate seal members 56. Said gas pressure also acts behind each end face seal strip 62 to add to the pressure of the spring 64 against said end face seal strip.

The depth of each step 76 in an intermediate sealing member 56 in a direction parallel to the axis of said member is the same as the width, in this direction, of the end face seal strip 62 received in said step so that, when the rear face 80 of this step engages its associated end face seal strip 62, the end faces of said intermediate seal member 56 and seal strip 62 engageable with the adjacent end wall are flush with each other. Accordingly, the gas pressure behind each intermediate sealing member 56 cannot cause said member to project beyond its associated end face seal strips 62. Hence, the radially outer edge of the intake port 40 can be disposed radially outwardly of the path of travel of each intermediate sealing member 56 without danger of said member projecting into said port when alined therewith. This construction therefore permits a larger intake port than would be possible if motion of the intermediate seal members 56 were not so restrained by the end face seal strips 62.

FIG. 8 illustrates a modification of the structure shown in FIG. 7. For ease of understanding, the parts of FIG. 8 corresponding to the parts of FIG. 7 have been designated by the same reference numerals but with a subscript $a$ added thereto. In FIG. 8 each notch 76$a$ of an intermediate seal member 56$a$ has a tongue or rib 82 received within a longitudinal groove in the end portion of the radially inner surface of the associated end face seal strip 62$a$ to provide a tongue and groove connection therebetween such that said intermediate seal member 56$a$ has an interlocking connection with the ends of both associated end face seal strips 62$a$ (only one of which is shown in FIG. 8). This interlocking connection between the seal elements 56$a$ and 62$a$ in effect comprises a flexible or articulated joint which locks these elements together to positively hold the end face of each seal member 56$a$ flush with the outer surfaces of the two adjacent seal strips 62$a$. In this way any cocking of said seal strips 62$a$ or even of the members 56$a$ which cause their end corners to dig into the adjacent end wall 14 or 16 is positively prevented.

The axial width of the rotor 24 between its end faces 26 and 28 preferably is only slightly less than the axial spacing of the outer body end walls 14 and 16. Thus at normal operating temperatures the sum of the clearances between the two end faces of the rotor and the adjacent end walls preferably is no greater than about one quarter of one percent of the axial width of the rotor between its end faces. With this close fit between the rotor end faces and the end walls 14 and 16, said rotor end faces help provide the running fit or guidance between the rotor end faces and said end walls. In addition such a close fit at the rotor periphery and in the region of the end face seals 62 helps to increase the effectiveness of said end face seals. Thus with the entire length of each rotor end face seal strip 62 disposed a substantial distance radially inwardly of the rotor periphery, as illustrated, and with such a close fit, outwardly of said seal strips, between the adjacent rotor end face and end wall of the outer body any flow of combustion gases through said close fit will result in a substantial pressure drop before the gases reach said seal strip 62 thereby reducing the pressure differential across said seal strip.

The radially outer portion of the rotor 24 will run hotter during engine operation than the more radially inwardly disposed rotor portions. Accordingly, when the engine is cold the portion of the rotor radially outwardly of the end face seal strips 62 should have a larger clearance 84 (FIGS. 4–5) with the adjacent end walls 14 and 16 than the clearance 86 of the rotor portions radially inwardly of said seal strips in order that both said portions have substantially the same aforementioned close fit with said end walls during engine operating. For purpose of illustration, the magnitude of the clearances 84 and 86 and their difference, when the engine is cold, have been exaggerated in FIG. 4. For example, in the case of a rotor 24 made of an aluminum alloy and having an axial width of about 3 inches, when the engine is cold the width of the rotor between its end faces 26 and 28 radially outwardly of the end face seal strips 62 preferably is about 0.004 inch less than the rotor width inwardly of said seal strips. The operating temperature of the rotor progressively decreases toward the center of the rotor. Accordingly, the axial width of the rotor between its end faces when the engine is cold can be progressively increased toward its center or, as illustrated, another step 88 of increased width can be provided.

In order to complete the seal around the working chambers 32 the axial ends of the apex seal strips must also have good sealing engagement with the end walls 12 and 14 of the outer body as well as with the engine width of the inner surface of the peripheral wall 18. It has been found that the apex seal strips 52 may have a one-piece construction and still have such sealing engagement notwithstanding the substantial difference in the temperature rise of the outer body 12 upon engine operation as compared to the much higher temperature rise of the inner rotor seal strips 52. Thus in the case of an engine having its outer body cooled by a liquid, such as water, as provided by water circulation passages 72, one-piece apex seal strips 52 having satisfactory sealing with the outer body peripheral wall as well as its end walls can be provided if the material of the apex seal strips is chosen so that the ratio of the thermal coefficient of expansion of its material to the corresponding coefficient of the material of the peripheral wall 18 of the outer body is in the range of 0.4 to 0.7 and preferably is approximately 0.4. With apex seal material having a thermal coefficient of expansion such as to make said coefficient ratio have a value approaching the upper end of said range, the ends of each apex seal strip 52 will have slightly more clearance with the end walls 14 and 16 of the outer body when the engine is cold and just starting as compared to the clearance when the engine has reached its normal operating temperatures. However, within said coefficient range each apex seal strip can have a length such that the clearance between its ends and the end walls 14 and 16 is such as to provide an adequate seal both when the engine is cold and when the engine has reached its operating temperatures as well as at intermediate temperature conditions.

The thermal coefficient of expansion however is not the only property of a material determining its suitably for use as an apex seal strip 52. Obviously, other properties such as wear, strength, etc. also must be considered. A suitable material for peripheral wall 18 of the outer body 12 is a gray cast iron, such as has been used for the cylinder heads of reciprocating internal combustion engines, which for example may have a thermal coefficient of expansion of $7.1 \times 10^{-6}$ per °F. With a liquid (such as water) cooled outer body 12 having its peripheral wall 18 made of such gray cast iron material following are three examples of materials suitable for the one-piece apex seals 52.

(1) A material known as Invar having a thermal coefficient of expansion of $3.2 \times 10^{-6}$ per °F. and having the following composition:

|  | Percent |
|---|---|
| Nickel | 42% |
| Manganese | trace |
| Silicon | trace |
| Carbon | trace |
| Iron | balance |

(2) A material known as Niresist D5B having a thermal coefficient of expansion of $4.7 \times 10^{-6}$ per °F. and having the following composition:

|  |  | Percent |
|---|---|---|
| Carbon | (maximum) | 2.40 |
| Silicon |  | 1.50–2.75 |
| Manganese | (maximum) | 0.50 |
| Phosphorus | do | 0.08 |
| Nickel |  | 34.0–36.0 |
| Chromium |  | 2.0–3.0 |
| Iron |  | balance |

(3) A tungsten carbide material having a thermal coefficient of expansion of $3.0 \times 10^{-6}$ per °F.:

|  | Percent |
|---|---|
| Tungsten carbide | 68 |
| Cobalt | 27 |
| Tantalum carbide | 5 |

In the case of Invar, this material does not have satisfactory wear characteristics. However, it can be coated with a suitable wear resistance material such as Stellite No. 1, such coating materials being applied by a fusion or welding-type operation.

The selection of a suitable material for the one-piece apex seal strip 52 necessarily involves a compromise between its thermal coefficient of expansion and other properties of the material affecting its use as such a seal. Thus the second material described above known as Niresist D5B has a thermal coefficient adjacent the upper limit of the range 0.4 to 0.7 whereas the lower limit of the range is the preferred value of said coefficient. However, Niresist D5B material has excellent strength and wear characteristics which at least in part compensate for the fact that its thermal coefficient is not the optimum value.

The peripheral wall 18 of the outer body 12 of the engine may also be made of an aluminum alloy such as has also been used for the cylinder heads of reciprocating internal combustion engines. Such aluminum alloys have a thermal coefficient of expansion within the range 10 to $14 \times 10^{-6}$ per °F. With the peripheral wall 18 of the outer body made of such as aluminum alloy the following two materials are examples of suitable materials for use as one-piece apex seals 52.

(a) A material known as Niresist D3A having a thermal coefficient of expansion of $6.7 \times 10^{-6}$ per °F. and having the following composition:

|  |  | Percent |
|---|---|---|
| Carbon | (maximum) | 2.60 |
| Silicon |  | 1.50–2.00 |
| Manganese | (maximum) | 0.50 |
| Phosphorus | do | 0.08 |
| Nickel |  | 28.0–32.0 |
| Chromium |  | 1.00–1.50 |
| Iron |  | balance |

(b) A nodular cast iron material having a thermal coefficient of expansion of $6.9 \times 10^{-6}$ per °F.

|  |  | Percent |
|---|---|---|
| Carbon |  | 3.2–4.0 |
| Manganese | (maximum) | 0.8 |
| Silicon |  | 1.7–2.5 |
| Phosphorus |  | 0.08 |
| Iron |  | balance |

The outer body may be air cooled rather than water cooled as illustrated. In the case of an air cooled engine the temperature difference between that of the rotor 24 and that of the outer body 12 during engine operation is less than what it would be with a water cooled engine. It has been found that in case of an air cooled engine that the temperature coefficient of expansion of the seal material should be such that the ratio of said coefficient to that of the peripheral wall 18 preferably is within the range 0.65 to 0.80. For example, in the case of an air cooled engine having a peripheral wall 18 made of gray cast iron material, the Niresist D5B material would still be suitable as the material of the apex seal strips 52 since the ratio of the thermal coefficients of these two materials also falls within the last mentioned range.

While I have described my invention in detail in its preferred embodiment, it will be obvious to those skilled in the art, after understanding my invention that various changes and modifications may be made therein without departing from the spirit or scope thereof. I aim, in the appended claims, to cover all such modifications.

I claim as my invention:

1. A sealing arrangement for the working chambers of a rotary combustion engine comprising an outer body having axially-spaced end walls and a peripheral wall interconnecting said end walls to form a cavity therebetween; an inner rotor received within said cavity and having axially-spaced end faces adjacent to said end walls and also having a plurality of circumferentially-spaced apex portions for engagement with the inner surface of said peripheral wall to form a plurality of working chambers between said rotor and peripheral wall which vary in volume upon relative rotation of said rotor and outer body; said seal arrangement comprising a plurality of one-piece metallic strips eacch extending along and carried by one of said rotor apex portions for sealing engagement with the inner surface of said peripheral wall, each said one-piece metallic seal strip having a thermal coefficient of expansion which is substantially less than that of said peripheral wall and having a length such that each of its ends is disposed in good sealing relation with the adjacent end wall of the outer body at least when said seal strip and outer body are at their respective normal engine operating temperatures; and means carried by said rotor at each apex portion for urging the associated apex seal strip radially outwardly into sealing engagement with said peripheral wall inner surface.

2. A seal arrangement as recited in claim 1 in which said outer body is liquid cooled and the ratio of the thermal coefficient of expansion of the material of said apex seal strips to that of the material of the peripheral wall of the outer body is within the range of 0.4 to 0.7.

3. A seal structure as recited in claim 2 in which the material of said outer body peripheral wall is of gray cast iron and the material of each seal strip has approximately the following composition:

| | Percent |
|---|---|
| Carbon _____maximum__ | 2.40 |
| Silicon _____ | 1.50–2.75 |
| Manganese _____(maximum)__ | 0.50 |
| Phosphorus _____do____ | 0.08 |
| Nickel _____ | 34.0–36.0 |
| Chromium _____ | 2.0–3.0 |
| Iron _____ | balance |

4. A seal structure as recited in claim 2 in which the material of said outer body is an aluminum alloy having thermal coefficient of expansion within the range of 10 to $14 \times 10^{-6}$ per °F. and the material of the seal strip is a nodular cast iron having a temperature coefficient of expansion of approximately $7 \times 10^{-6}$ per °F.

5. A seal structure as recited in claim 1 in which said outer body is air cooled and the ratio of the thermal coefficient of expansion of the material of said seal strips to that of the material of the peripheral wall of the outer body is within the range 0.65 to 0.80.

6. A sealing arrangement as recited in claim 1 in which each one-piece apex seal strip is received within a groove in its associated rotor apex portion and including a plurality of one-piece seal strips received in grooves in a rotor end face for sealing engagement with the adjacent end wall of the outer body, there being one such end face seal strip for and extending between each pair of adjacent rotor apex portions; and means providing sealing cooperation at each rotor apex portion between the adjacent ends of a pair of one-piece end face seal strips and the adjacent end of a one-piece apex seal strip.

7. A sealing arrangement as recited in claim 6 in which, when the engine is operating, the total clearance between the two rotor end faces and the adjacent end walls of the outer body is no greater than about one quarter of one percent of the axial width of the rotor between its end faces.

8. A sealing arrangement as recited in claim 7 in which each one-piece end face seal strip is disposed radially inwardly of the periphery of the rotor along the entire length of said strip and the portion of the rotor end face outwardly of each end face seal strip has said close fit with the adacent end wall during engine operation.

9. A sealing arrangement as recited in claim 8 in which when the engine is shut down the axial clearance between a rotor end face and the adjacent outer body end wall is slightly greater on the radially outer side of said end face seal strips than on their radially inner side.

10. A sealing arrangement as recited in claim 1 in which each one-piece apex seal strip is received within a groove in its associated rotor apex portion and including a plurality of one-piece seal strips received in grooves in a rotor end face, there being one such end face seal strip for and extending between each pair of adjacent rotor apex portions with each end face seal strip being movable in a direction parallel to the rotor axis for engagement with the adjacent end wall; and a plurality of seal members each carried by said rotor in and at an end of a rotor apex groove for sealing engagement with the adjacent end of the one-piece apex seal strip received within said apex groove and with the ends of the two adjacent end face seal strips, each said seal member being movable in a direction parallel to the rotor axis for sealing engagement of its end face with the adjacent end wall.

11. A sealing arrangement as recited in claim 10 in which each seal member and the associated seal strips have engageable surfaces for preventing movement of the end face of said seal member beyond its associated seal strips.

12. A sealing arrangement as recited in claim 11 in which each seal member and the associated seal strips have an interlocking connection to maintain the end wall engaging surfaces of said seal strips flush with the end face of said seal member.

13. A sealing arrangement for the working chambers of a rotary combustion engine comprising an outer body having axially-spaced end walls and a peripheral wall interconnecting said end walls to form a cavity therebetween; an inner rotor received within said cavity and having axially-spaced end faces adjacent to said end walls for continuous sealing cooperation therewith and also having a plurality of circumferentially-spaced apex portions for continuous sealing cooperation with the inner surface of said peripheral wall to form a plurality of working chambers between said rotor and peripheral wall which vary in volume upon relative rotation of said rotor and outer body; said seal arrangement comprising a plurality of radially movable seal strip means carried by and extending along said rotor apex portions, there being one such seal means for and received in a groove in each rotor apex portion with said seal strip means having peripheral-wall engaging seal faces along their radially outer edges; a plurality of seal strips received in grooves in a rotor end face and being movable in a direction parallel to the rotor axis with said seal strip having end-wall-engaging seal faces, there being one such end face seal strip for and extending between each pair of adjacent rotor apex portions substantially parallel to the periphery of the rotor between said apex portions; and a plurality of seal members each carried by said rotor in and at an end of a rotor apex groove for sealing engagement with the adjacent end of the apex seal means received within said apex groove and with the ends of the two adjacent end face seal strips, each said seal member being movable in a direction parallel to the rotor axis with each seal member having an end-wall-engaging seal face, and each seal member and its associated end face seal strips having engageable surfaces for preventing movement of the end face of said seal member beyond its associated seal strips.

14. A sealing arrangement as recited in claim 13 in which each seal member and the associated seal strips have an interlocking connection to maintain the end-wall-engaging seal faces of said seal strips flush with the end-wall-engaging seal face of said seal member.

15. A sealing arrangement as recited in claim 13 in which, when the engine is operating the total clearance between the rotor end faces and the adjacent end walls of the outer body is no greater than about one-quarter of one percent of the axial width of the rotor between its end faces.

16. A sealing arrangement as recited in claim 15 in which each end face seal strip is disposed radially inwardly of the periphery of the rotor along the entire length of said strip and the portion of the rotor end face outwardly of each end face seal strip has said close fit with the adjacent end wall during engine operation.

17. A sealing arrangement as recited in claim 16 in which when the engine is shut down the axial width of the rotor is slightly less radially outwardly of said end face seal strips than radially inwardly of said strips.

References Cited in the file of this patent

UNITED STATES PATENTS 1,617,863 Planche _____ Feb. 15, 1927